July 26, 1938.   H. ULLMER   2,125,178
BILLET SURFACING PROCESS AND MACHINE
Filed Oct. 29, 1935   3 Sheets-Sheet 3

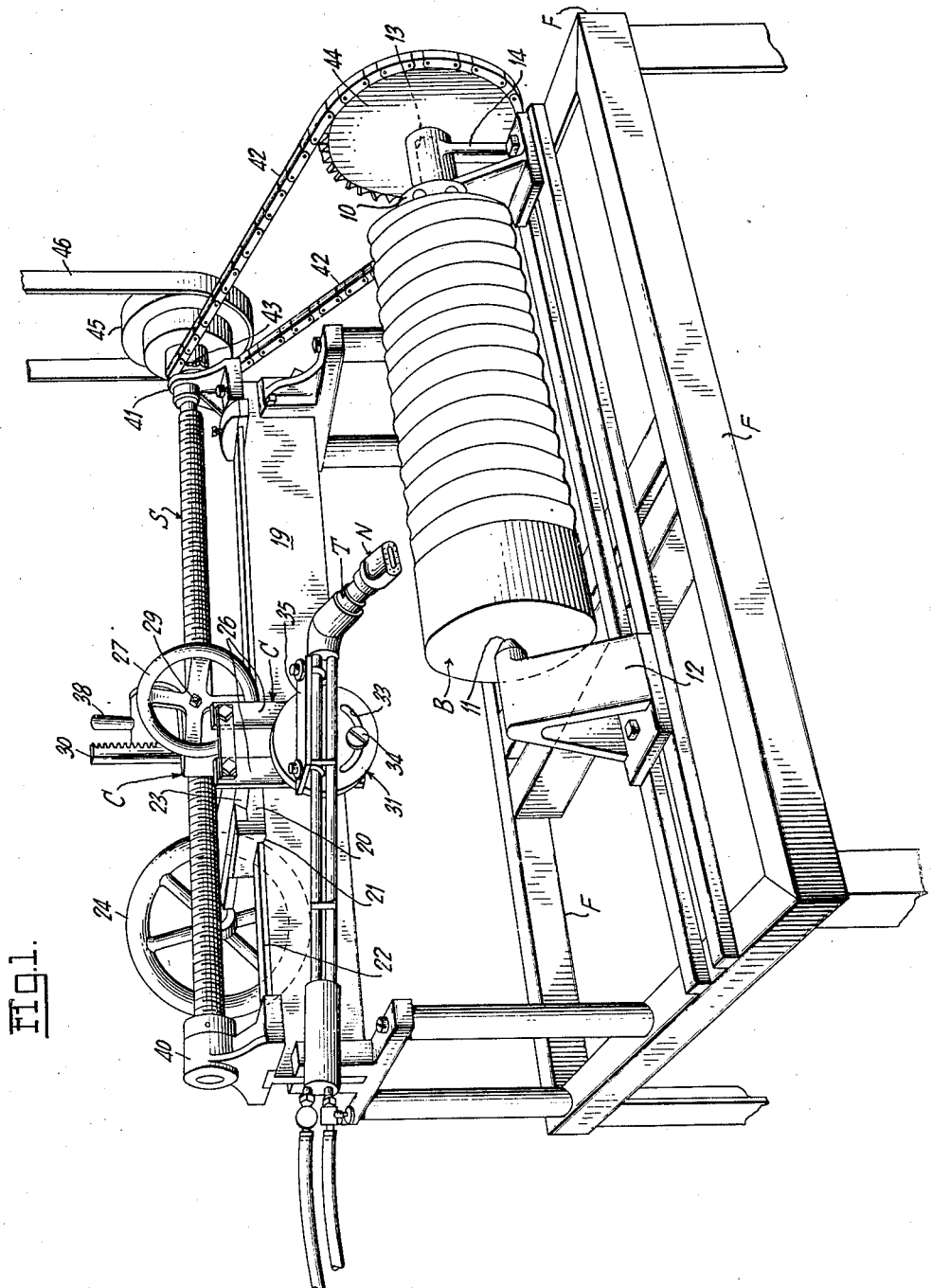

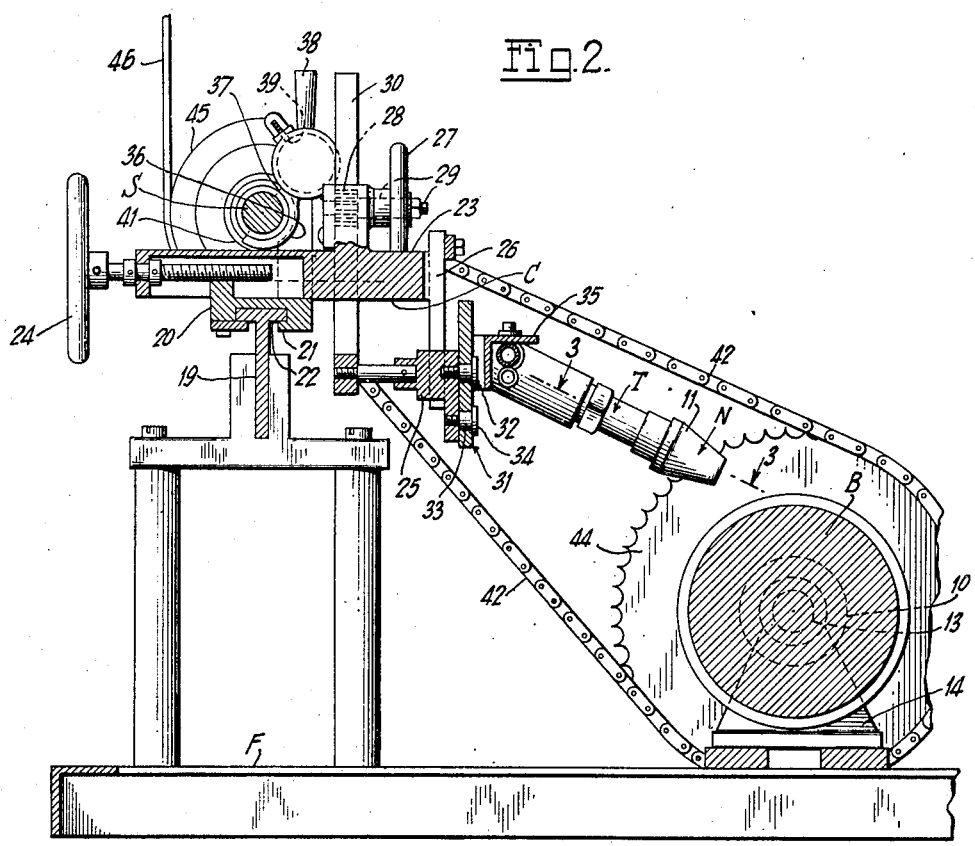

INVENTOR
Herman Ullmer
BY
Watson, Bristol, Johnson & Leavenworth
ATTORNEYS

Patented July 26, 1938

2,125,178

UNITED STATES PATENT OFFICE 2,125,178

BILLET SURFACING PROCESS AND MACHINE

Herman Ullmer, Larchmont, N. Y., assignor, by mesne assignments, to Union Carbide and Carbon Corporation, a corporation of New York Application October 29, 1935, Serial No. 47,249

16 Claims. (Cl. 148—9)

This invention relates to a process of thermo-chemically removing surface layers from bodies of ferrous metal, such as billets and the like, and to a machine for carrying out the process. The invention has particular application to the "peeling" or desurfacing of metal bodies of the character indicated in order to eliminate defects in the surface thereof, such as scale, seams, fins, and the like, and to expose defects going deeper than the layer removed, preparatory to the formation of a finished product from the body, for example, the formation of seamless tubing from cylindrical billets.

This application is a continuation in part of my copending application, Serial No. 566,106, filed September 30, 1931.

The method of eliminating such defects, as heretofore practiced, was accomplished either mechanically, for example, by portable manual chipping tools or by stationary heavy duty machine tools, or thermo-chemically; this latter method of accomplishment being generally practiced with manually manipulated oxygen applying torches that also have a heating flame which initiates and maintains the reaction. When using manual chipping tools, the operation is slow and costly. Machine tools, on the other hand, which are adapted to perform the operation are heavy and expensive and consume a considerable amount of operating power to overcome the braking resistance to the relative motion between the cutting tools and the metal body.

An important object of the invention is, therefore, to provide improved steps in the process and an improved apparatus for rapidly and inexpensively removing surface layers thermo-chemically from metal bodies, such as billets and the like, whereby the expenditure of operating power, in carrying out the process, may be materially reduced as compared with processes heretofore known and whereby lighter and less costly mechanism may be employed in the practice of the process than has heretofore been possible.

A further object of the invention is to provide an improved machine whereby an oxidizing means, such as a stream of commercially pure oxygen, may be successfully and economically employed in removing a surface layer from a metal body.

Other objects of the invention will in part be obvious and will in part appear hereinafter.

The invention accordingly comprises the several steps and the relation of one or more of such steps with respect to each of the others, the apparatus embodying features of construction, combinations and arrangement of parts, adapted to effect such steps, and the article which possesses the characteristics, properties and relation of elements, all as exemplified in the detailed disclosure hereinafter set forth, and the scope of the invention will be indicated in the claims.

For a fuller understanding of the nature and objects of the invention reference should be had to the following detailed description taken in connection with the accompanying drawings, in which:

Fig. 1 is a perspective view of a lathe-type machine for thermo-chemically desurfacing a cylindrical billet in accordance with the present invention;

Fig. 2 is a cross section of the machine shown in Fig. 1, taken in a vertical plane that is at right angles to the axis of rotation of the cylindrical billet;

Fig. 3 is a longitudinal sectional view showing details on an enlarged scale, as compared with Figs. 1 and 2, of the nozzle illustrated in Figs. 1 and 2;

Fig. 4 is an end elevation of the nozzle shown in Fig. 3;

Fig. 5 is a fragmentary view partly in section and partly in elevation, showing a modified arrangement of nozzles for carrying out the process of the invention;

In the practice of the present invention, a relatively voluminous stream of oxidizing gas, for example commercially pure oxygen, under suitable pressure is caused to impinge at an acute angle upon the body, whose surface is to be removed.

The stream impinges with a velocity which is adapted to maintain a reaction at the surface in a substantially uniform manner. The range of velocities of the stream of oxygen gas, adapted for this purpose, is that generally referred to as the "low velocity range" and has for its upper limit the acoustic velocity, which is in the neighborhood of 1,000 ft. per second, and is preferably greater than 200 ft. per second. When this reaction is under way, some metal is completely oxidized and rises in the form of brown smoke and may be blown away. At the same time, however, there is formed a puddle, composed partly of molten material and partly of oxidized material, on which the oxygen stream plays and comprises the reaction zone where surface material is removed by the action of the oxygen stream as it advances; the puddle being maintained by the heat produced by oxidation. The molten metal of the puddle is continuously oxidized and maintained at a temperature sufficient to melt underlying surface metal. Simultaneously with the formation of the puddle, there appears a wave or spray of molten material, consisting mainly of slag, which issues from the puddle and is washed ahead of the advancing oxygen stream during a desurfacing operation.

Figure 6:
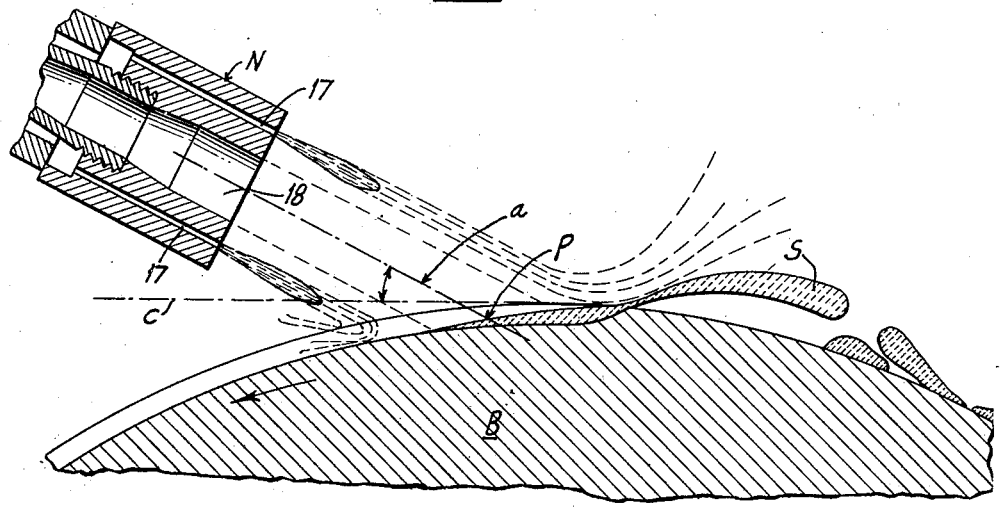
Fig. 6 is an explanatory diagram mainly in section illustrating features in the present process of surface removal.

The relation of the puddle and the slag to the metal body and the oxygen stream is shown in detail in Fig. 6. Here, the metal body being desurfaced is illustrated as a billet B, of cylindrical form, which has adjacently disposed a nozzle N from the central orifice 18 of which issues a stream of oxygen gas that impinges at an acute angle to a tangent $c$ drawn to the surface in the direction of advance; the direction of the stream being taken as that of its central axis $a$. The angle of impingement then is the angle that the line $a$ makes with the line $c$, and in general may have a value between 10 and 35 degrees; a value of about 25 degrees being found to be relatively advantageous. The reaction puddle which forms on and adheres to the surface of the billet in the region where the oxygen stream impinges is indicated by the shaded area denoted P, while the wave of slag that moves ahead of the oxygen stream is denoted S.

In order that the surface removing reaction may be maintained in the uniform manner desired, the variable factors are so correlated that the rate of reaction is such as to keep the reaction puddle substantially constant in shape and size. This condition obtains substantially as long as the correlated values of the several controlling factors when suitably selected are retained constant. The following is an example of suitable correlated values of the several factors which achieve the desired removal of thin strata from the surface of a cylindrical billet:

| | |
|---|---|
| Length of billet_____inches__ | 18 |
| Diameter of billet_____do____ | 6 |
| Angle of impingement____with horizontal__ | 25° |
| Oxygen stream velocity_____ft./second__ | 408 |
| Effective diameter for metering bore of oxygen nozzle_____inches__ | .199 |
| Rate of longitudinal travel____in./minute__ | 5.1 |
| Rate of advance along channel formed ft./minute__ | 8 |

To initiate the reaction of the oxygen stream with the metal when applied to the surface of the body being desurfaced, the outermost layer of the body is heated to its ignition or kindling temperature. This heating of the surface may be localized to the region upon which the oxygen stream is to be played, and may be accomplished by any suitable means, for example, by means of a combustible gas jet. In practice such jet is applied to successive surface portions so as to heat the same to the desired temperature simultaneously with applications of the oxygen stream during its advance. Such application also contributes during the desurfacing operation to the maintenance of the temperature of the metal in the reaction zone at the required temperature and supplements at a substantially constant rate the heat imparted to the puddle by oxidation.

The particular step and means used for raising the surface of the body to its kindling temperature, whether the heat is localized or extended over the entire surface, or whether it is supplied simultaneously with the oxygen stream or by an independently moved heating agent, is of secondary importance except as a matter of convenience and economy. The application of the heat however is preferably by means of an oxy-gas heating jet traveling with the oxygen stream. In desurfacing cylindrical billets, the travel of the heating jet and oxygen stream may be in a helical path longitudinally to the billet; travel in such a path being effected by the rotation of the billet simultaneously with the rectilinear movement of the jet and stream lengthwise of the billet. It will be understood, of course, that the same effect may be obtained by revolving the jet and stream in a helical path about the billet with the billet held stationary. It is advantageous in carrying out the process of the present invention, that the heating jet and oxygen stream be applied together and simultaneously in order to effect economies in oxygen consumption. The rate of advance in such case is adjusted with respect to the rate of the oxidizing reaction so as to remove a thin stratum of metal to a desired depth, and as each new portion of the surface is reached, it is at the reaction temperature. As a result, when the oxygen stream advances, the reaction puddle remains imperforate and of substantially constant shape and size.

Apparatus for carrying out the process comprises a suitable support for the metal body which is to be desurfaced, together with means for applying the oxygen stream and the heating jet obliquely against the surface of the body, in a manner such that the slag evolved may freely pass away, without impeding the flow of the oxygen stream or heating jet. Means is also provided for causing relative motion between the body and the oxygen stream with its heating jet together with suitable means for adjusting the same with respect to the body. For the desurfacing of a cylindrical billet, a lathe-type machine is advantageously employed.

Referring now to the drawings, there is shown, by way of example, a machine which rotatively supports a cylindrical billet B for desurfacing. The machine has a frame F which is provided with head and tail centers, shown respectively at 10 and 11, which support the work, i. e., the cylindrical billet B, so as to rotate about a desired axis. Adjacent the work there is supported a torch T having a nozzle N for applying the heating jet and oxygen stream transversely and at an acute angle to a tangent at the top surface of the rotating work. To this end there is provided a carriage C which adjustably supports the torch and nozzle in an overhung manner; there being associated means, such as a feed screw S for propelling the carriage, together with the torch and nozzle so as to move lengthwise of the rotating work.

The tail center 11 may be mounted on the tail stock 12 and be adjustably supported on the frame F for engagement and support of the billet centrally at one end. The head center 10 may be in the nature of a chuck for gripping and supporting the billet at its other end and may be secured to a shaft 13 journalled in the head stock 14.

The torch used with the machine as outlined above, is, as indicated, of a character such as to provide an oxygen stream of comparatively great volume and low velocity together with a jet or jets of combustible gas so positioned and in such number as to heat the surface of the work to its ignition temperature in a desired period of time. The velocity of the oxygen stream may have a value between 200 and 1000 ft. per second, values between 300 and 600 ft. per second being quite satisfactory. At such velocities, the oxygen stream will not puncture the puddle of molten material adhering to the surface metal at the reaction zone, nor push it out of its uniform path of travel as is the case with higher velocities of oxygen. With the higher velocities of oxygen, i. e., above 1000 ft. per second, the puddle is punctured and the melting and burning of the surface is irregular, leaving a channel that is rough and uneven while its surface is frequently discolored and has firmly adhering scale. The new surface of a body desurfaced with a stream of low velocity oxygen, on the other hand, is hard, smooth and easily cleaned, when desired, by means of a metal brush.

A suitable construction of the torch T adapted to this end is represented in detail in Figs. 3 and 4 of the drawings and comprises a nozzle N having a central oxygen passage 16 surrounded by a plurality of passages 17 for fuel gas. The central passage 16 is preferably enlarged toward its discharge end 18, and may be elongated parallel to the surface of the billet, e. g. flattened to an oval as shown in Fig. 4, whereby the delivered oxygen stream is elongated transversely of its longitudinal axis and the width of said stream, measured parallel to the surface of the billet, is substantially greater than its thickness. By this construction the oxygen will be applied against the billet over a relatively wide area and in such a manner that the rate of desurfacing or burning away of the metal will be facilitated and the sides of the contiguous channels formed will have a gradual slope whereby the newly formed surface will be devoid of steep sides and fins.

The torch T is moved longitudinally of the work, as the latter is rotated, by means of the carriage C upon which it is mounted and its orifices are adjusted to a position such that the oxygen stream and heating jets will be directed transversely to the surface of the work, preferably at the top as shown, and at a slight angle to the tangent at the point of application. The jets of fuel gas issuing from passages 17 may be located so as substantially to envelop the oxygen stream and preheat the surface of the work ahead of the points where the oxygen stream impinges. A suitable operating pressure for the oxygen gas is 100 lbs., and for acetylene when used as the fuel, about 1½ lbs.

The carriage C, in its travel, is guided by the track 19 and is propelled by the feed screw S with which it is in threaded engagement as will hereinafter appear. The carriage comprises a base 20 which is slidably mounted on the track 19 and is provided with flanges 21 interengaging with flanges 22 extending laterally from the track.

The torch T is mounted on the carriage so as to depend away from the same and over the work and has substantially universal adjustment. This is accomplished by means of a horizontal slide 23 that is in dovetailed engagement with a base of the carriage whereby motion transversely of the frame F is accomplished under control of the handwheel 24, and a vertical slide 25 arranged to engage movably with the vertical guides 26 secured to the slide 23. This vertical movement is accomplished under the control of a handwheel 27; said handwheel being connected to a pinion 28 by means of a shaft 29 which is journaled to the slide 23, the teeth of the pinion being in engagement with those of a rack 30 secured to the slide block 25. Angular adjustment of the torch is accomplished by means of a disc 31 which is pivoted to the slide block 25 by a pin 32; the disc having an arcuate slot 33 through which a set screw 34 is extended into the block for holding the disc in various angular positions and the torch is further connected to the disc for adjustment transversely thereof by a suitable clamp 35.

By means of these adjustments the torch nozzle may be adjusted to any level with respect to the work; may be directed at various angles thereto; and may be positioned at various distances from the work as occasion may require, thereby adapting the machine to a multiplicity of variations in work conditions.

The means for actuating the carriage C from the feed screw S here shown, comprises a half nut 36 secured to an arm of a bell crank lever 37 which is pivoted at its bend to the carriage, the threads of the half nut being movable into and out of engagement with those of the feed screw through the instrumentality of a handle 38; the nut being held in and out of engagement with the feed screw by a pawl and ratchet as shown at 39, the elements of which are secured respectively to the carriage and lever. It will readily appear that this arrangement adapts the torch for use in making a desurfacing pass transversely of the work, or for use in making a pass lengthwise thereof at the will of the operator.

The feed screw is mounted for rotation in suitable bearings 40 and 41 secured to the track 19 and is in driving connection with the head center 10 through a sprocket chain 42 trained about sprocket wheels 43 and 44 respectively on the feed screw shaft and on the shaft 13 to which the head center is connected. By this arrangement rotation of the work in synchronism with the travel of the torch is effected and may be so timed that the oxygen stream applied by the torch will remove metal from the surface of the work to the desired depth.

Since removal of the surface of the work is essentially one of oxidation, and the rapidity with which this takes place depends upon the nature of the work and upon the velocity and angle of impingement of the oxygen stream, it is essential that the speed at which the oxygen stream and preheating jets travel along the work surface be adjustable to these conditions. The machine is accordingly equipped with suitable speed change mechanism, for example, variable speed pulleys 45 secured to the feed screw shaft and driven from a suitable source of power (not shown) by a belt 46.

The process as carried out, and the operation of the machine described above is as follows:

Power is applied for rotating the feed screw S which, through sprocket chain 42 rotates the shaft 13 and the work connected thereto. The carriage C and the torch T carried thereby are at the same time caused to travel lengthwise of the billet by the rotation of the feed screw S; the oxygen stream and heating jets being, the while, directed transversely of and generally tangentially to the top surface of the billet in order to be applied across the work surface and contiguously to and substantially parallel to successive surface portions of such work, thereby burning away metal to such a depth as will remove all faulty metal or expose such faults as extend below the surface deeper than the layer being removed. The application of the jets may be regulated through their adjustment relative to the carriage C in the manner as set forth above, so as to control the desurfacing operation. By detaching the carriage from the feed screw, the torch may be used to make a circumferential groove in the billet. It is also within the scope of the invention to operate and adjust the torch so as to form a spiral groove on the work, or to bring an otherwise shaped billet to cylindrical form.

The practice of the present process is not confined to the use of a single nozzle, since a plurality of oxygen streams of the same or different size and intensity may be employed. As shown in Fig. 5 of the drawings two such nozzles are employed; the first serving to rough out the work, the second following to remove metal to a lesser degree but with greater refinement. A pair of nozzles arranged for this purpose are shown respectively at 47 and 48. The first is designed for making a roughing cut on the billet and the second is positioned for giving the same the more refined finish. To this end, the nozzle 47 is proportioned to discharge the more voluminous oxygen stream and forms a channel with ridges at the sides as it advances. The nozzle 48 which discharges a lesser stream is positioned in a following relation to nozzle 47 at a point where the lesser stream impinges on a ridge that is formed by the first nozzle. The ridge is hence removed leaving a relatively smooth finished surface. Nozzles for this purpose advantageously have their orifices elongated as shown in a direction parallel to the surface being removed. The desurfacing of metal bodies also may be hastened by providing a plurality of nozzles sufficiently spaced apart and each adapted to traverse a portion only of the work surface to form the contiguous channels desired, the oxygen streams and heating jets in each nozzle for this purpose being of the same size and intensity.

By the employment of low velocity oxygen torches instead of mechanical cutting tools in machines of the above character, an immense saving in the operating cost of such machines is possible, since there is little or no resistance between the work and the desurfacing means. In consequence, the machines of the present invention may be made much lighter and at a lower cost than heretofore. For this reason also a great saving in power is effected and particularly when compared with the power required to force or feed a metal body through a peeling head such as is commonly employed in desurfacing operations.

Figure 7:
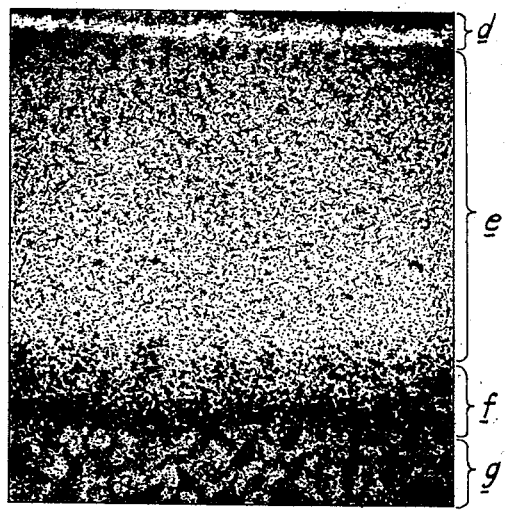
Fig. 7 is a view depicting a photomicrograph of a section of an article produced in accordance with the invention.

The resulting article produced, when a body of ferrous metal is thermo-chemically desurfaced in accordance with the invention, has a new envelope with properties whereby the article may be identified and differentiated from the metal of the body before being processed and also distinguished from that of similar articles produced by other processes. The new envelope has a surface which is clean, smooth and glass like and relatively free from discoloration and is characterized by a series of contiguously formed uniform channels or paths traversing the surface. The photomicrograph depicted in Fig. 7 shows a portion of the envelope, extending to the surface, of a typical etched and polished section of such desurfaced body; the portion being composed of four zones or strata of different crystal structures, denoted respectively $d$, $e$, $f$, and $g$. Here the lowermost stratum $g$ shows the unchanged interior structure of the body, while the strata $d$, $e$ and $f$ are seen to consist of a changed or new fine grain structure that is substantially free from mechanical deformation and is of increased hardness. The zone $f$ comprises largely troostite which is formed by rapidly cooling from a temperature just above the transformation temperature; while zone $e$ comprises mainly martensite formed by cooling from a higher temperature. The topmost stratum $d$ is seen to consist of a layer that contains needles of martensite embedded in a matrix of austenite whose presence shows that this zone has an excess of carbon over that of the average composition of the body, which carbon is relatively uniformly distributed and imparts to the body a surface having increased hardness and resistance to oxidation. The appearance of zone $d$ at the desurfaced face indicates that this portion was cooled from the fused state.

An average distance for the inward extent of this new structure from the surface is $\frac{1}{32}$ inch. A billet thermo-chemically desurfaced by the present invention thus has the further advantage, as an intermediate product to be processed in the steel mill, over a billet otherwise desurfaced, that the excess of carbon engendered in its surface counteracts the surface decarburization usually encountered in connection with the reheating of such intermediate products, since there already exists in the surface of a billet, when thus desurfaced, a desired excess of carbon.

Since certain changes may be made in carrying out the above process and in the product, and modifications effected in the apparatus for practicing the principle thereof, without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A process of thermo-chemically desurfacing bodies of ferrous metal, which comprises heating the surface of the body to the ignition temperature in the region where a desurfacing operation is to be initiated, applying a relatively voluminous oxygen stream that impinges on the surface of said body at an acute angle to the direction in which said operation is to advance, forming a channel leaving ridges at the sides, applying a second stream following the first positioned so as to remove a ridge, said streams being given a velocity below the acoustic of such value that the puddle which forms in the region of impingement is not punctured, causing the removal of a relatively thin stratum of metal from at least a major portion of the surface of said body, and maintaining the rate of advance and the angles of impingement constant and correlated with the oxygen stream velocity so as to produce a new surface envelope which has a fine grained structure, reveals deep faults, is gloss-smooth, uniformly hard and devoid of fins.

2. The process of removing surface metal at its ignition temperature from a cylindrical ferrous body, which comprises the steps of rotating the body about an axis of symmetry, applying across and at an acute angle to the surface a heating jet and an oxygen stream having a velocity between 200 and 1000 feet per second, said heating jet and oxygen stream being applied in the direction in which metal removal is to be effected, and progressively moving said heating jet and oxygen stream lengthwise of the body at a substantially uniform rate coordinated with said rate of rotation and said stream velocity so as to remove surface metal along a helical path.

3. In a billet desurfacing machine, the combination comprising means including a nozzle for providing an oxidizing gas stream, means for causing relative travel between the nozzle and a billet to be desurfaced, said nozzle having its outlet orifice flattened and elongated in a direction parallel to the surface of the billet and arranged to apply said oxidizing gas stream at a slight acute angle to a tangent to the surface of said billet and in contact therewith whereby a molten puddle produced by said gas stream tends to flow over the successive surface portions from which metal is to be removed.

4. A process of thermo-chemically desurfacing a cylindrical billet of ferrous metal, which comprises disposing a billet of the character indicated for rotation about a longitudinal axis, locally heating the surface to the oxygen ignition temperature, impinging a relatively voluminous stream of oxidizing gas with a gas velocity below the acoustic upon said surface when at said ignition temperature, inclining said stream so as to impinge on the cylindrical surface at a constant acute angle of a value between 10 and 35 degrees, rotating said billet at a constant rate, advancing said stream parallel to said axis at a rate proportional to the volume of gas applied, and correlating said rate of rotation and said rate of advance with the gas velocity and angle of impingement so as to remove continuously a relatively thin stratum of surface metal of relatively uniform thickness from said cylindrical surface and form therein a helical channel which has a new, hard and smooth surface.

5. A process of thermo-chemically desurfacing a cylindrical billet of ferrous metal, which comprises rotating the billet about a longitudinal axis, applying to the cylindrical surface of said billet when at the ignition temperature a relatively voluminous stream of oxidizing gas having a velocity of between 200 and 1,000 feet per second across a top surface of said billet, said stream being impinged at an acute angle of from 10 to 35 degrees to a plane tangent to said top surface, causing said stream to advance helically over the cylindrical surface with component rates of rotation and of axial movement such as to remove by the reaction induced a relatively shallow layer of metal from the surface of said billet while permitting the molten slag that forms to flow over advance portions of the cylindrical surface from which metal is to be removed, and coordinating said rates with the gas velocity and the angle of impingement and the amount of gas supplied so that the reaction is continuous and a substantially complete peeling of the billet is obtained.

6. A process of thermo-chemically removing a shallow layer of metal from a surface of a ferrous metal body, such as a steel billet, such process comprising discharging a low-velocity voluminous oxidizing stream from a nozzle having an elongated outlet orifice to provide a stream elongated transversely of its longitudinal axis or direction of flow; applying such stream obliquely against said surface heated to a kindling temperature while maintaining the longer transverse axis of said stream substantially parallel to said surface, to produce a relatively wide region of superficial metal combustion on said surface; and effecting relative movement of said body and said nozzle at a uniform rate while maintaining substantially constant the oblique angle of impingement of said stream against said surface, whereby such region of superficial metal combustion is advanced along said surface and a relatively wide shallow layer of metal is removed therefrom.

7. A process of thermo-chemically removing metal from a surface of a ferrous metal body such as a steel billet, such process comprising discharging, from a nozzle and obliquely against said surface, a heating medium and a low-velocity voluminous stream of oxidizing gas to produce a region of superficial metal combustion on said surface; effecting relative movement of said body and said nozzle to discharge said heating medium and said oxidizing stream against successive portions of said surface to advance such superficial metal combustion and effect a roughing removal of metal from said surface; and, during such relative movement, discharging a second heating medium and a second low-velocity stream of oxidizing gas obliquely against successive surface portions exposed by the first oxidizing stream, to produce and advance a second region of superficial metal combustion and effect a finishing removal of metal from said surface.

8. Apparatus for thermo-chemically desurfacing a cylindrical of ferrous metal, comprising means for rotatably supporting said body to turn about a longitudinal axis, a carriage movably mounted with respect to said supporting means, an oxidizing gas applying nozzle adjustably mounted upon said carriage and positioned to project over said body so as to permit the slag that forms to fall away, said nozzle having associated means for supplying heating gas to heat locally the surface of said body to a desired temperature and a passage proportioned and shaped for supplying a relatively voluminous stream of oxidizing gas with a relatively low velocity, said nozzle also being inclined with respect to the body at an acute angle of from 10 to 35 degrees to the cylindrical surface to impinge the stream of oxidizing gas in a direction in which said stream is to advance circumferentially, and power-driven means for simultaneously rotating said billet and moving said carriage at constant rates respectively such that the relative motion between said body and said nozzle forms a hard, smooth, shallow, helical path over the entire cylindrical surface of said body.

9. Apparatus for thermo-chemically desurfacing a body of ferrous metal, comprising means for supporting said body in a position to be operated upon, a carriage movable with respect to said supporting means, a plurality of oxidizing gas applying nozzles mounted upon said carriage and positioned to apply oxidizing gas upon a surface to be removed from said body, associated means for supplying heating gas to heat locally the surface to be removed to a desired temperature, said nozzles being proportioned to deliver oxidizing gas in relatively voluminous amounts at relatively low velocities and provided with means whereby they are adjusted to deliver the oxidizing gas at constant acute angles to the surface being removed and substantially in the direction in which surface removal is to advance, one of said nozzles being positioned to effect an initial or roughing metal-removing reaction, a second nozzle being positioned a desired distance behind said roughing nozzle and arranged to effect a finishing reaction, and power means for relatively moving said body and said nozzles at a constant rate such that uniformly thin strata of surface metal are continuously removed, producing a bright, new, hardened surface free from fin and characterized by a plurality of contiguous paths.

10. Apparatus for thermo-chemically removing metal from a surface of a ferrous metal body, such as a steel billet, such apparatus comprising, in combination, a nozzle constructed and arranged to discharge a low-velocity voluminous stream of oxidizing gas obliquely against said surface to remove metal from the latter when said surface is heated to a kindling temperature; a second nozzle constructed and arranged to discharge a low-velocity voluminous stream of oxidizing gas obliquely against portions of said body exposed by the oxidizing gas stream discharged from the first named nozzle, the oxidizing gas stream discharged by said second nozzle being adapted to remove metal from such exposed portions of the body when the latter are heated to a kindling temperature; and means for effecting relative movement of said body and said nozzles at a uniform rate and in a direction parallel to said surface.

11. Apparatus as claimed in claim 10, in which the cross-sectional area of the oxidizing gas discharge orifice of one of said nozzles is greater than the cross-sectional area of the oxidizing gas discharge orifice of the other nozzle.

12. Apparatus as claimed in claim 10, in which the oxidizing gas discharge orifice of one of said nozzles is wider than the oxidizing gas discharge orifice of the other nozzle.

13. Apparatus as claimed in claim 10, in which the cross-sectional area and the width of the oxidizing gas discharge orifice of the first named nozzle are greater than the cross-sectional area and the width, respectively, of the oxidizing gas discharge orifice of the second named nozzle.

14. Apparatus for thermo-chemically removing metal from a surface of a metal body, such as a steel billet, such apparatus comprising, in combination, a nozzle having means for discharging a heating medium against said surface and also having an outlet constructed and arranged to discharge a low-velocity stream of oxidizing gas obliquely against portions of said surface heated by said medium, to remove metal from said surface; a second nozzle behind the first named nozzle and having means for discharging a heating medium against portions of said body exposed by said stream of oxidizing gas, said second nozzle also having an outlet constructed and arranged to discharge a low-velocity voluminous stream of oxidizing gas obliquely against such exposed heated portions of said body, to remove additional metal from said body; a carrier for said nozzles, the latter being mounted on said carrier in spaced relation, with the first named nozzle ahead of the second nozzle; and means for effecting relative movement of said body and said carrier at a uniform rate substantially parallel to said surface, whereby both a roughing metal removal and a finishing metal removal are effected in one pass of said nozzles relatively to said body.

15. Apparatus for thermo-chemically removing metal from a surface of a ferrous metal body, such as a steel billet, comprising means for supporting said body in a position to be operated upon, a carrier, means for effecting relative movement between said carrier and said body in a direction parallel to the surface of said body to be operated upon, a nozzle adapted to discharge a low velocity voluminous stream of oxidizing gas, said nozzle being supported upon said carrier and positioned thereon to direct said stream obliquely against heated portions of said surface to remove surface metal and produce a channel thereon, a second nozzle adapted to discharge a low velocity oxidizing gas stream having a cross-sectional area smaller than said first-mentioned stream, said second nozzle being supported upon said carrier adjacent to said first-mentioned nozzle and positioned thereon to direct said smaller stream obliquely against heated portions of surface metal adjacent to and including an edge of said channel whereby said streams effect simultaneously a roughing and a finishing metal removal in one pass of said nozzles along the surface.

16. Apparatus for thermo-chemically desurfacing a ferrous metal body, means for supporting such body in a position to be operated upon, carrying means in operative association with said supporting means, a nozzle associated with said carrying means for discharging a low velocity voluminous stream of oxidizing gas obliquely against a portion of the surface of said body when at the oxygen ignition temperature and adapted to effect the removal of surface metal and produce a channel thereon having ridges at its sides, a second nozzle associated with said carrier means in a position following said first nozzle and discharging a second low velocity oxidizing gas stream of less volume than said first named stream and arranged to impinge said second stream obliquely upon a ridge that is formed by the said first nozzle whereby roughing and finishing metal removing reactions are effected, producing a relatively smooth, flat, hard surface, and power driven means for effecting relative motion between said carrier and said body at a constant rate correlated with the gas velocity and angles of impingement whereby the surface removing reactions are carried out continuously and uniformly.

HERMAN ULLMER.

CERTIFICATE OF CORRECTION.

Patent No. 2,125,178.                                                    July 26, 1938.

HERMAN ULLMER.

It is hereby certified that error appears in the printed specification of the above numbered patent requiring correction as follows: Page 4, second column, line 67, claim 1, for the word "gloss-smooth" read glass-smooth; page 5, second column, line 30, claim 8, after "cylindrical" insert body; and that the said Letters Patent should be read with this correction therein that the same may conform to the record of the case in the Patent Office.

Signed and sealed this 20th day of September, A. D. 1938.

Henry Van Arsdale (Seal)                                                    Acting Commissioner of Patents.